United States Patent
Yoshioka et al.

(10) Patent No.: US 11,757,602 B2
(45) Date of Patent: *Sep. 12, 2023

(54) APPARATUS AND COMMUNICATION METHOD FOR MAPPING TRANSPORT BLOCKS

(71) Applicant: NTT DOCOMO, INC., Tokyo (JP)

(72) Inventors: Shohei Yoshioka, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 28 days.

This patent is subject to a terminal disclaimer.

(21) Appl. No.: 17/512,193

(22) Filed: Oct. 27, 2021

(65) Prior Publication Data

US 2022/0052830 A1    Feb. 17, 2022

Related U.S. Application Data

(63) Continuation of application No. 16/756,374, filed as application No. PCT/JP2017/037737 on Oct. 18, 2017, now Pat. No. 11,184,141.

(51) Int. Cl.
*H04L 5/10* (2006.01)
*H04B 7/0456* (2017.01)
*H04L 5/00* (2006.01)

(52) U.S. Cl.
CPC ............ *H04L 5/10* (2013.01); *H04B 7/0456* (2013.01); *H04L 5/0044* (2013.01); *H04L 5/0051* (2013.01)

(58) Field of Classification Search
None
See application file for complete search history.

(56) References Cited

U.S. PATENT DOCUMENTS 11,184,141 B2 * 11/2021 Yoshioka ............. H04L 5/0044
2008/0225965 A1   9/2008 Pi et al.
(Continued)

FOREIGN PATENT DOCUMENTS

JP    2017-528027 A    9/2017

OTHER PUBLICATIONS

International Search Report issued in PCT/JP2017/037737 dated Jan. 16, 2018 (4 pages).
(Continued)

*Primary Examiner* — Diane L Lo
(74) *Attorney, Agent, or Firm* — Osha Bergman Watanabe & Burton LLP

(57) ABSTRACT

An apparatus is disclosed including an input unit configured to receive an input; a control unit configured to map a transport block including a plurality of code blocks to a plurality of symbols; and a communication module including a transmission unit configured to transmit a signal including the plurality of symbols, wherein the control unit maps the transport block to the plurality of symbols so that a number of resource elements of a first code block is less than a number of resource elements of a second code block, the first code block being nearest to a demodulation reference signal in a time domain, and the second code block being farthest from the demodulation reference signal in the time domain. In other aspects, another apparatus and a method are also disclosed.

6 Claims, 7 Drawing Sheets

(56) References Cited

U.S. PATENT DOCUMENTS

| | | |
|---|---|---|
| 2015/0245383 A1 | 8/2015 | Seo et al. |
| 2016/0013897 A1 | 1/2016 | Sun et al. |
| 2019/0123849 A1 | 4/2019 | Baldemair et al. |

OTHER PUBLICATIONS

Written Opinion of the International Searching Authority issued in PCT/JP2017/037737 dated Jan. 16, 2018 (3 pages).

Nokia, Nokia Shanghai Bell; "Mapping code blocks to code block groups"; 3GPP TSG-RAN WG1 #90, R1-1714012; Prague, Czech Republic; Aug. 21-25, 2017 (3 pages).

3GPP TS 38.212 V1.0.0; "3rd Generation Partnership Project; Technical Specification Group Radio Access Network; NR; Multiplexing and channel coding (Release 15)" Sep. 2017 (28 pages).

Extended European Search Report issued in counterpart European Patent Application No. 17928888.1, dated May 27, 2021 (7 pages).

\* cited by examiner

APPARATUS AND COMMUNICATION METHOD FOR MAPPING TRANSPORT BLOCKS

CROSS-REFERENCE TO RELATED APPLICATIONS

The present application is a continuation application and, thereby, claims benefit under 35 U.S.C. § 120 to U.S. patent application Ser. No. 16/756,374 filed on Apr. 15, 2020, titled, "TERMINAL, COMMUNICATION METHOD, AND BASE STATION FOR MAPPING TRANSPORT BLOCKS," which is a national stage application of PCT Application No. PCT/JP2017/037737, filed on Oct. 18, 2017. The contents of these applications are incorporated by reference in their entirety.

TECHNICAL FIELD

The present invention relates to an apparatus and a communication method in a radio communication system.

BACKGROUND ART

In 3GPP (3rd Generation Partnership Project), in order to further increase a system capacity, further increase a data transmission rate, further reduce delay in a radio section, and so on, a radio communication scheme (hereinafter, the radio communication scheme is referred to as "5G" or "NR (New Radio)") called as 5G or NR has been discussed. In NR, various radio techniques have been discussed in order to satisfy a requirement that delay of a radio section should be reduced to be less than or equal to 1 ms while achieving throughput higher than or equal to 10 Gbps.

In 5G, from a bitstream constituting one transport block (hereinafter also referred to as "TB"), a plurality of code blocks (hereinafter also referred to as "CBs") are generated (for example, Non-Patent Document 1). The plurality of CBs are mapped to allocation resources to perform transmission (for example, Non-Patent Document 2).

RELATED-ART DOCUMENTS

Non-Patent Document

Non-Patent Document 1: Nokia, Nokia Shanghai Bell, Mapping code blocks to code block groups, 3GPP TSG-RAN WG1#90, R1-1714012 (2017-08)

Non-Patent Document 2: 3GPP TS 38.212 V1.0.0 (2017-09)

SUMMARY OF THE INVENTION

Problems to be Solved by the Invention

Transmission of an ACK/NACK indicating whether a TB was received successfully or not is performed for each TB or CB group (hereinafter also referred to as "CBG") composed of a plurality of CBs. In prior art, since control related to encoding is performed without considering an error rate of each CB in a plurality of CBs included in a TB or CBG, there is a problem that an error rate of the TB or CBG gets high.

The present invention was made in light of the above, and it is an object to decrease an error rate of a transport block or code block group in encoding of a radio communication system.

Means to Solve the Problem

According to a technique of the present disclosure, There is provided a communication device that communicates with another communication device, the communication device comprising: an arranging unit configured to arrange a demodulation reference signal and a group including a plurality of code blocks in a radio frame; and a transmitting unit configured to transmit the radio frame to the other communication device, wherein the plurality of code blocks are arranged in the radio frame based on a position of the demodulation reference signal in the radio frame.

Advantage of the Invention

According to the technique of the present disclosure, it is possible to decrease an error rate of a transport block or code block group in encoding of a radio communication system.

MODE FOR CARRYING OUT THE INVENTION

Hereinafter, embodiments of the present invention will be described with reference to the accompanying drawings. The embodiments described below are only examples and embodiments to which the present invention is applied are not limited to the following embodiments.

For operations of a radio communication system according to the embodiments, existing techniques are used as appropriate. Although such an existing technique is, for example, existing LTE, the existing techniques are limited to existing LTE. The term "LTE" as used in this specification has a broad meaning including LIE-Advanced and schemes after LTE-Advanced (for example, NR) unless otherwise specified.

In the embodiments described below, the terms "SS (Synchronization Signal)," "PSS (Primary SS)," "SSS (Secondary SS)," "PBCH (Physical broadcast channel)," "PRACH (Physical RACH)," and so on used in existing LTE are used. This is for convenience of description, and signals, functions, and so on similar to the above terms may be called as other terms. The above terms in NR correspond to NR-SS, NR-PSS, NR-SSS, NR-PBCH, NR-PRACH, and so on.

Figure 1:
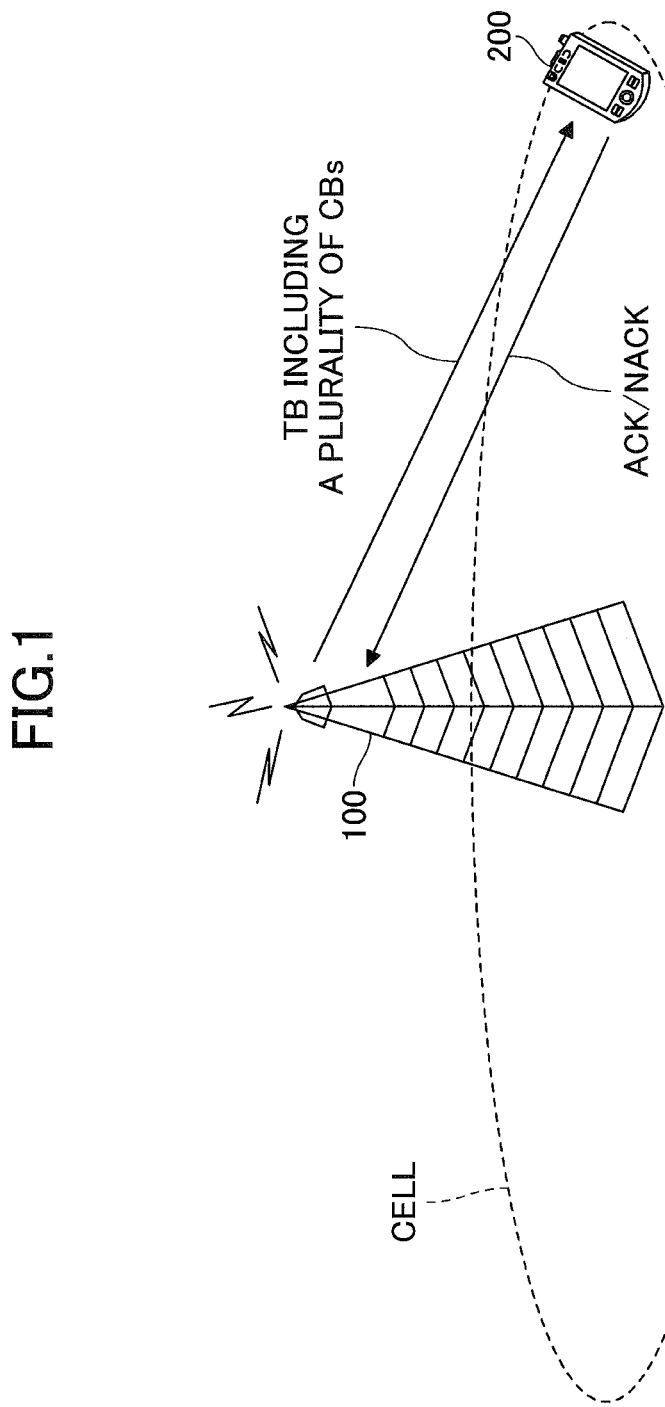
FIG. 1 is a diagram illustrating a configuration example of a radio communication system in an embodiment of the present invention.

FIG. 1 is a diagram illustrating a configuration example of a radio communication system in an embodiment of the present invention. As illustrated in FIG. 1, the radio communication system in the embodiment of the present invention includes a base station device 100 and a user equipment 200. Although one base station device 100 and one user equipment 200 are illustrated in FIG. 1, this is an example and a plurality of base station devices and a plurality of user equipments may be present.

The base station device 100 is a communication device that provides one or more cells and performs radio communication with the user equipment 200. The user equipment 200 is a smartphone, mobile phone, tablet, wearable terminal, or communication device comprising a radio communication function such as a communication module for M2M (Machine-to-Machine), and wirelessly connects to the base station device 100 and utilizes various communication services provided by the radio communication system. Both of the base station device 100 and the user equipment 200 can perform beamforming to transmit and receive signals.

As illustrated in FIG. 1, the base station device 100 transmits a TB including a plurality of CBs to the user equipment 200. Further, a plurality of CBs may constitute (form) a CBG and a plurality of CBGs may constitute (form) a TB. The user equipment 200 transmits, to the base station device 100, an ACK/NACK indicating the TB or CBG was received successfully or not.

Similarly to the down link that is transmission from the base station device 100 to the user equipment 200, in an up link, the user equipment 200 may transmit a TB including a plurality of CBs or CBGs to the base station device 100, and the base station device 100 may transmits, to the user equipment 200, an ACK/NACK indicating the TB or CBG was received successfully or not.

In this embodiment, the duplex scheme may be a TDD (Time Division Duplex) scheme, an FDD (Frequency Division Duplex) scheme, or another (for example, Flexible Duplex or the like) scheme different from these schemes.

In the following description, transmitting a signal using a transmit beam may be transmitting the signal multiplied by a precoding vector (precoded with the precoding vector). Similarly, receiving a signal using a receive beam may be multiplying the received signal by a predetermined weight vector. Transmitting a signal using a transmit beam may be represented as transmitting the signal via a particular antenna port. Similarly, receiving a signal using a receive beam may be represented as receiving the signal via a particular antenna port. An antenna port refers to the logical antenna port or physical antenna port defined in the 3GPP standard. A method of forming a transmit beam and receive beam is not limited to the above method. For example, in the base station device 100 and the user equipment 200 each comprising a plurality of antennas, a method changing an angle of each antenna may be used, a method combining the method using the precoding vector with the method changing the angle of each antenna may be used, different antenna panels may be utilized to be switched, a method combining a method using a plurality of antenna panels together may be used, or another method may be used. Also, for example, a plurality of transmit beams different from each other may be used in a high frequency band. Using a plurality of transmit beams is referred to as multi-beam operation and using one transmit beam is referred to as single-beam operation.

Embodiment 1

Embodiment 1 will be described below.

Figure 2:
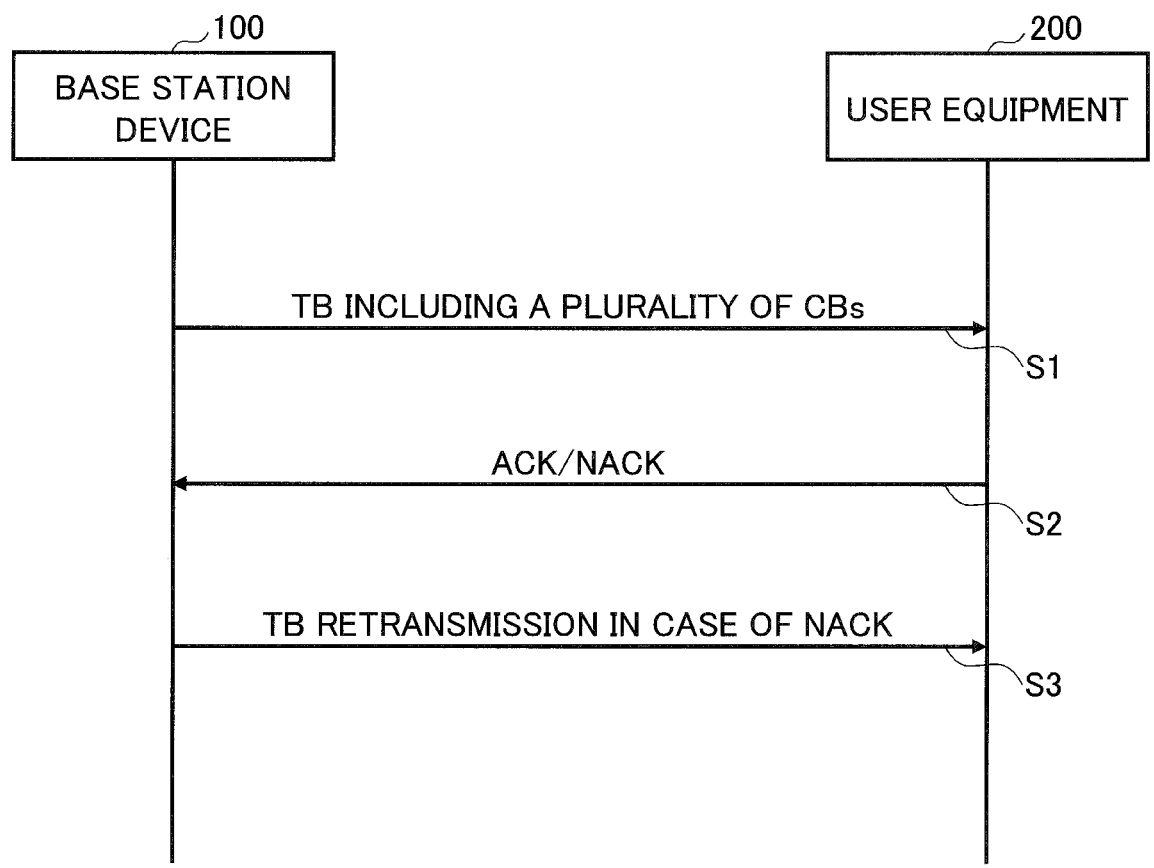
FIG. 2 is a diagram illustrating an example of a communication sequence in an embodiment of the present invention.

FIG. 2 is a diagram illustrating an example of a communication sequence in an embodiment of the present invention. As illustrated in FIG. 2, in step S1, the base station device 100 transmits a TB including a plurality of CBs to the user equipment 200. As described in FIG. 1, a plurality of CBs may constitute a CBG and a plurality of CBGs may constitute a TB.

Then, in step S2, the user equipment 200 transmits, to the base station device 100, an ACK/NACK indicating the TB or CBG was received successfully or not. If the NACK is transmitted to the base station device 100 in step S2, the base station device 100 retransmits the corresponding TB or CBG to the user equipment 200 (step S3).

With respect to above step S1 to step S3, the base station device 100 may be interchanged with the user equipment 200. That is, in step S1, the user equipment 200 transmits a TB or CBG including a plurality of CBs to the base station device 100. Then, in step S2, the base station device 100 transmits, to the user equipment 200, an ACK/NACK indicating the TB or CBG was received successfully or not. If the NACK is transmitted to the user equipment 200 in step S2, the user equipment 200 retransmits the corresponding TB or CBG to the base station device 100 (step S3).

Figure 3:
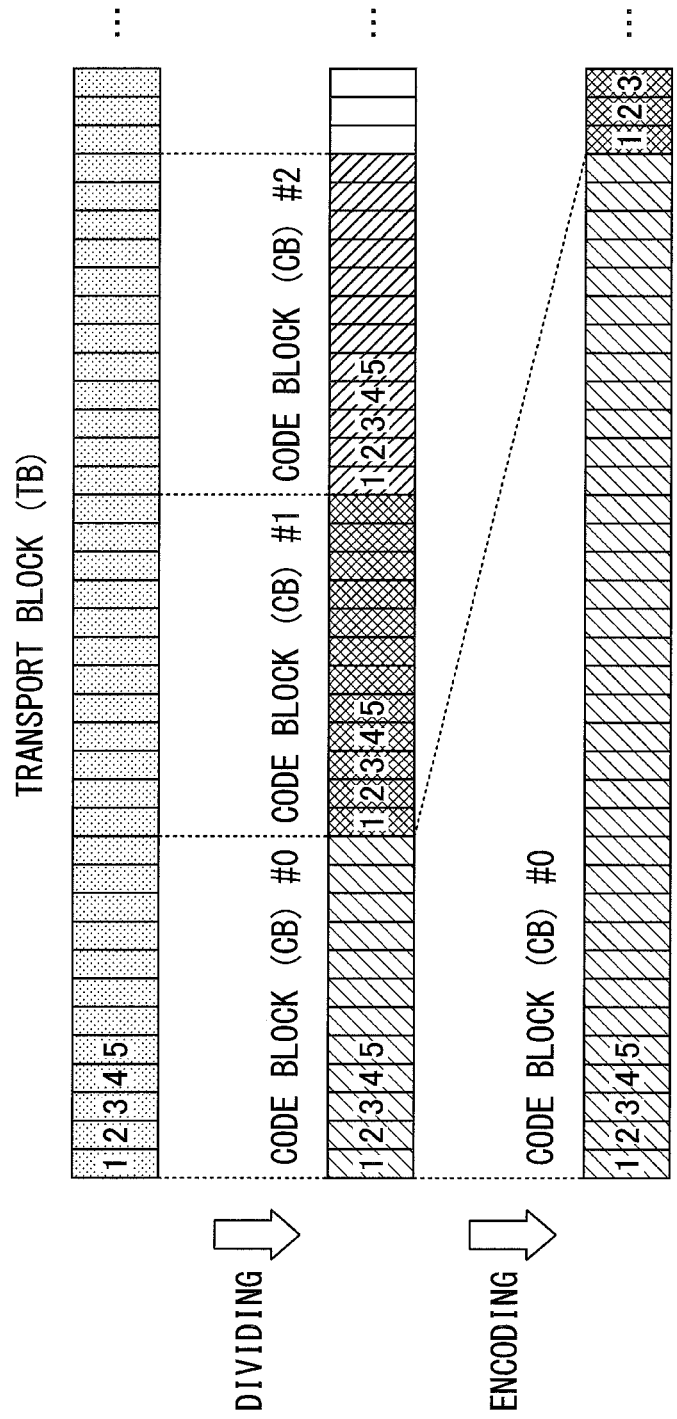
FIG. 3 is a diagram illustrating a configuration example of a TB and CBs in an embodiment of the present invention.

FIG. 3 is a diagram illustrating a configuration example of a TB and CBs in an embodiment of the present invention. In FIG. 3, a bitstream constituting a transport block (TB) is illustrated schematically. In FIG. 3, presentation of a parity bit for CRC (Cyclic Redundancy Check) is omitted.

As illustrated in FIG. 3, the TB is divided into some CBs. The TB indicates the top part of the bitstream, and the bitstream may further follow. Therefore, although CB#0, CB#1, and CB#2 are illustrated, one or more CBs may be further generated by division. Although not illustrated, some CBs may constitute a CBG and some CBGs may constitute a TB.

As illustrated in FIG. 3, the divided CBs are encoded on a CB basis. FIG. 3 is an example in which the bit length per CB is increased by rate matching.

Figure 4:
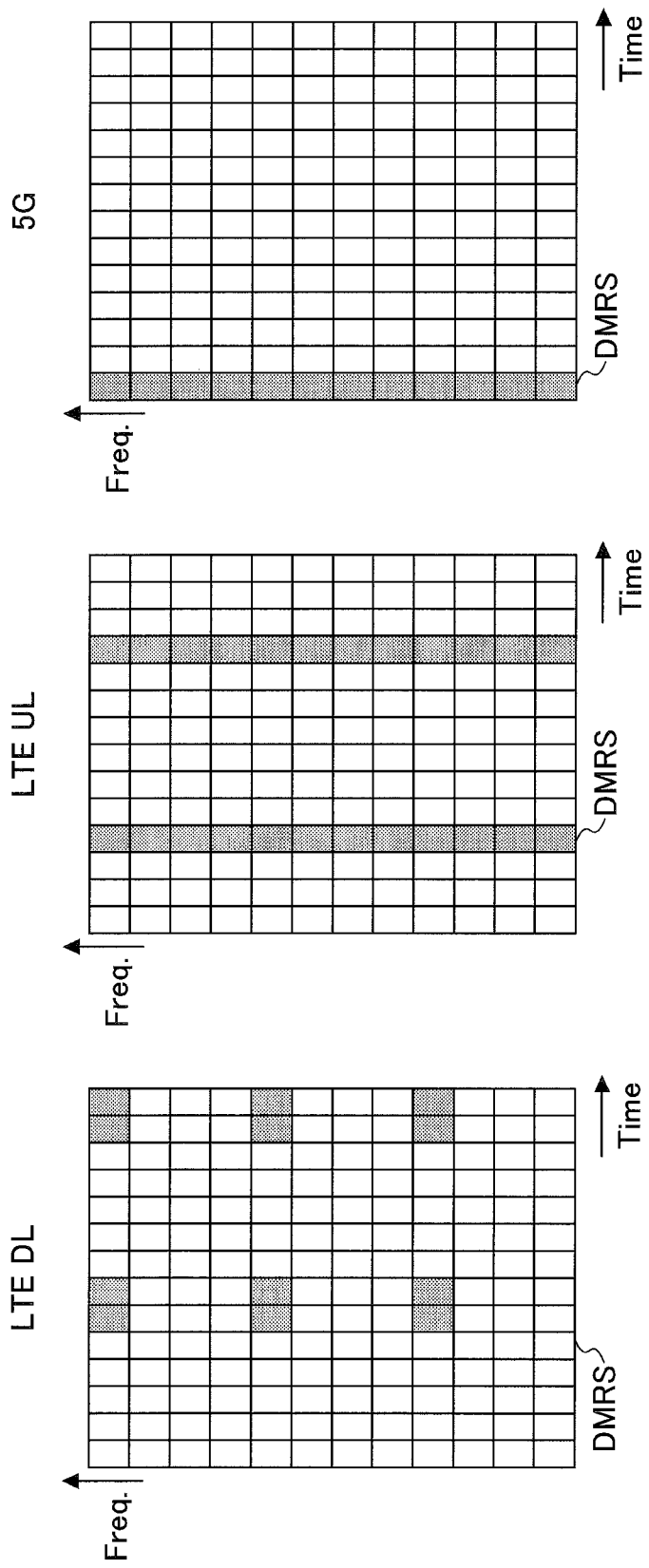
FIG. 4 is a diagram illustrating arrangement examples of DMRSs in an embodiment of the present invention.

FIG. 4 is a diagram illustrating arrangement examples of DMRSs in an embodiment of the present invention. FIG. 4 illustrates a configuration of a radio frame as a collection of resource elements (REs). As illustrated in FIG. 4, in "LTE DL (Down Link)," a DMRS (Demodulation Reference Signal) is arranged in the sixth, seventh, thirteenth, and fourteenth symbols in time domain, and the fourth, eighth, and twelfth subcarriers in frequency domain.

As illustrated in FIG. 4, in "LTE UL (Up Link)," a DMRS is arranged in the fourth and eleventh symbols in time domain, and the first to twelfth subcarriers in frequency domain.

On the other hand, as illustrated in FIG. 4, as an example of arrangement of a DMRS in "5G," a DMRS is arranged in the first symbol in time domain, and in the first to twelfth subcarriers in frequency domain. In "5G," a DMRS is arranged near the top part of a radio frame as Front-loaded DMRS. A DMRS may be arranged in a symbol other than the first symbol, for example, a rear symbol such as the second or third symbol. Also, for example, a DMRS may be arranged in one symbol or successive two symbols.

Here, with respect to demodulation of a symbol or an RE, channel estimation accuracy for a symbol or an RE close to a DMRS is improved compared to channel estimation accuracy for a symbol or an RE far from the DMRS. Therefore, since in "LTE DL" or "LTE UL," a DMRS is arranged relatively dispersedly in a radio frame, the difference in the channel estimation accuracy from the top to the end in the radio frame is relatively small. On the other hand, since in "5G," a DMRS is arranged near the top part of a radio frame, channel estimation accuracy for a symbol or an RE close to the top of the radio frame is improved compared to channel estimation accuracy for a symbol or an RE close to the end of the radio frame. That is, an error rate of a CB arranged in the symbol or RE close to the top of the radio frame is decreased compared to an error rate of a CB arranged in the symbol or RE close to the end of the radio frame.

In embodiments of the present invention, for decreasing an error rate of a TB or CBG, parameter setting of a CB is performed so as to make error rates of a plurality of CBs constituting a TB or CBG closer to uniformity. This is because a CB having the highest error rate among the plurality of CBs constituting the TB or CBG affects retransmission control of the TB or CBG due to an ACK/NACK being generated for each TB or CBG.

Figure 5:
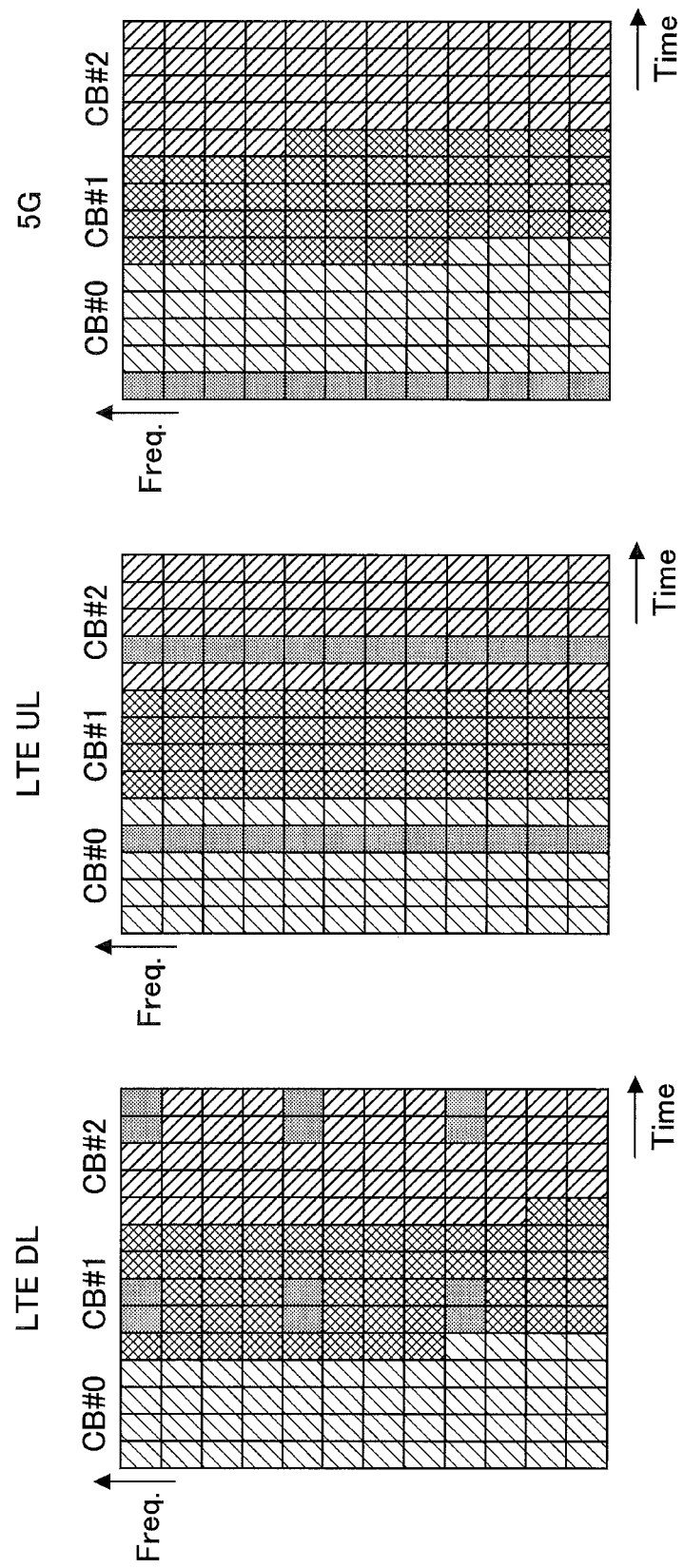
FIG. 5 is a diagram illustrating arrangement examples (1) of DMRSs and CBs in an embodiment of the present invention.

FIG. 5 is a diagram illustrating arrangement examples (1) of DMRSs and CBs in an embodiment of the present invention. As illustrated in FIG. 5, in "LTE DL," the number of REs allocated to CB#0 is 52 in total because there are 12 REs in the first symbol, 12 REs in the second symbol, 12 REs in the third symbol, 12 REs in the fourth symbol, and 4 REs in the fifth symbol. The number of REs allocated to CB#1 is 52 in total because there are 8 REs in the fifth symbol, 9 REs in the sixth symbol, 9 REs in the seventh symbol, 12 REs in the eighth symbol, 12 REs in the ninth symbol, and 2 REs in the tenth symbol. The number of REs allocated to CB#2 is 52 in total because there are 10 REs in the tenth symbol, 12 REs in the eleventh symbol, 12 REs in the twelfth symbol, 9 REs in the thirteenth symbol, and 9 REs in the fourteenth symbol. That is, the number of REs allocated to each of CB#0, CB#1, and CB#2 is 52.

As illustrated in FIG. 5, in "LTE UL," the number of REs allocated to CB#0 is 48 (12*4) in total because there are 12 REs in each of the first symbol, the second symbol, the third symbol, and the fifth symbol. The number of REs allocated to CB#1 is 48 (12*4) in total because there are 12 REs in each of the sixth symbol to the ninth symbol. The number of REs allocated to CB#2 is 48 (12*4) in total because there are 12 REs in each of the tenth symbol, the twelfth symbol, the thirteenth symbol, and the fourteenth symbol. That is, the number of REs allocated to each of CB#0, CB#1, and CB#2 is 48.

In an arrangement example of "5G" illustrated in FIG. 5, the number of REs allocated to CB#0 is 52 in total because there are 12 REs in the second symbol, 12 REs in the third symbol, 12 REs in the fourth symbol, 12 REs in the fifth symbol, and 4 REs in the sixth symbol. The number of REs allocated to CB#1 is 52 in total because there are 8 REs in the sixth symbol, 12 REs in the seventh symbol, 12 REs in the eighth symbol, 12 REs in the ninth symbol, and 8 REs in the ninth symbol. The number of REs allocated to CB#2 is 52 in total because there are 4 REs in the tenth symbol, 12 REs in the eleventh symbol, 12 REs in the twelfth symbol, 12 REs in the thirteenth symbol, and 12 REs in the fourteenth symbol. That is, the number of REs allocated to each of CB#0, CB#1, and CB#2 is 52.

As described above, the number of REs allocated to each CB is identical in LTE or 5G. Accordingly, a larger CB size increases an encoding rate and an error rate deteriorates.

Here, a method of determining a CB size in LTE will be described. Preconditions are as follows:
Maximum CB size Z=6144
Number of CBs=C
Input size (TB size+CRC for TB)=B
CRC size for CB L
Input size (including CRC for CB as well)=B'
CB size of $r^{th}$ CB=Kr
CB size (large)=$K_+$
CB size (small)=$K_-$
Number of CBs having CB size $K_+$=$C_+$
Number of CBs having CB size $K_-$=$C_-$ The "table defined in LTE" regarding K below is, for example, that of 188 kinds of division sizes defined such that K=40, 48, 56, 64, . . . , 6016, 6080, 6144.

A procedure of determining a CB size is as follows.
1) Dividing a TB into CBs
L=0, C=1, B'=B if B is less than or equal to Z
L=0, C=ceiling(B/(Z−L)), B'=B+C·L if B exceeds Z
2) Calculating a CB size The minimum K that satisfies a condition that C·K is higher than or equal to B' is determined from the table defined in LTE, and set as $K_+$.

The maximum K that satisfies a condition of K<$K_+$ is determined from the table defined in LIE, and set as $K_-$.
in case of C=1
$C_+$=1, $C_-$=0, $K_r$=$K_+$
in case of C>1
$C_-$=floor((C·$K_+$−B')/($K_+$−$K_-$))
$C_+$=C−$C_-$
$K_r$=$K_-$ if r is less than $C_-$
$K_r$=$K_+$ if r is higher than or equal to $C_-$ As indicated above, for the $r^{th}$ CB size $K_r$, $K_-$ is assigned to $K_r$ where r is small. That is, a size of a CB allocated to a front part in time domain of a radio frame is set small and a size of a CB allocated to a rear part is set large.

On the other hand, a first example of a method of determining a CB size in an embodiment of the present invention, especially in case of C>1, will be described.
in case of C>1
$C_-$=floor((C·$K_+$−B')/($K_+$−$K_-$))
$C_+$=C−$C_-$
$K_r$=$K_+$ if r is less than $C_-$
$K_r$=$K_+$ if r is higher than or equal to $C_-$ Therefore, for the $r^{th}$ CB size $K_r$, $K_+$ is assigned to Kr where r is small. That is, a size of a CB allocated to a front part in time domain of a radio frame is set large and a size of a CB allocated to a rear part is set small. As described in FIG. 4, in case of the arrangement example of the DMRS in 5G, the error rate of the CB arranged in the symbol or RE close to the top of the radio frame is decreased compared to the error rate of the CB arranged in the symbol or RE close to the end of the radio frame. Accordingly, if a size of a CB allocated to a front part in time domain of a radio frame is set large and a size of a CB allocated to a rear part is set small as described above, adjustment such that an error rate for each CB is made closer to uniformity is made.

A second example of a method of determining a CB size in an embodiment of the present invention, especially in case of C>1, will be described. The "defined table" below may be similar to that in LTE or a different table may be used.

The minimum K that satisfies a condition that C·K is higher than or equal to B' is determined from the defined table, and set as $K_+$.

(C−1) Ks prior to and subsequent to K+ are selected in the defined table, and these Ks and K+ are set as $K_{(0)}$, $K_{(1)}$, $K_{(2)}$, $K_{(3)}$, . . . , $K_{(C-1)}$ in a descending order.
in case of C>1
$C_r$=1 (the number of CBs having a CB size $K_r$ is 1),
$K_r$=$K_{(r)}$ As indicated above, for the $r^{th}$ CB size $Kr_r$, $K_{(r)}$ is assigned to $K_r$ in an ascending order of r. That is, a size of a CB allocated to a front part in time domain of a radio frame is set large and a size of a CB allocated to a rear part is set small. As described in FIG. 4, in case of the arrangement example of the DMRS in 5G, the error rate of the CB arranged in the symbol or RE close to the top of the radio frame is decreased compared to the error rate of the CB arranged in the symbol or RE close to the end of the radio frame. Accordingly, if a size of a CB allocated to a front part in time domain of a radio frame is set large and a size of a CB allocated to a rear part is set small as described above, adjustment such that an error rate for each CB is made closer to uniformity is made.

A CB size may not be determined from the defined table as described above. For example, a CB size may be determined from a predetermined formula, and a size of a CB allocated to a front part in time domain of a radio frame may be set large and a size of a CB allocated to a rear part may be set small.

With respect to arrangement of a DMRS, if an additional DMRS, i.e. Additional DMRS, is arranged in a radio frame or if a DMRS is arranged other than near the top part of a radio frame such as if Frequency hopping is applied, a large CB size may be set for a CB closer to the DMRS and a small CB size may be set for a CB farther from the DMRS. That is, a CB size may be set in a descending order from a CB closer to the DMRS to a CB farther from the DMRS rather than in a descending order from a front part in time domain of the radio frame.

Different CB sizes may not be set for all CBs, and the same CB size may be set for some CBs. Since channel estimation accuracy in a radio frame changes depending on a condition such as a distance between a CB and a DMRS, a moving speed of the user equipment 200, or the like, a CB size may be set such that an error rate of each CB is made closer to uniformity depending on the change in the channel estimation accuracy.

Figure 6:
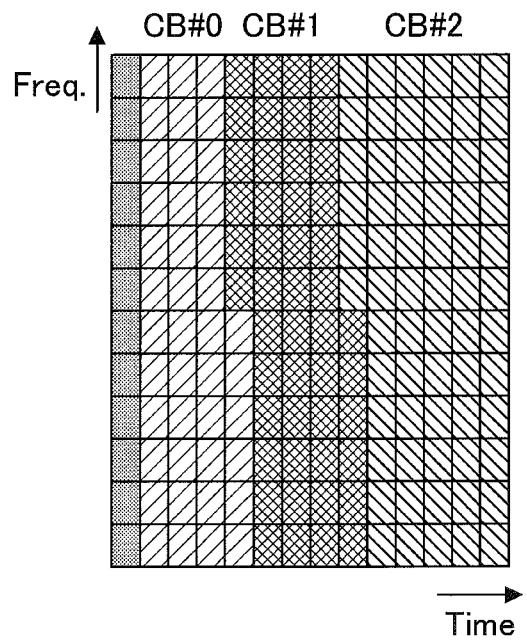
FIG. 6 is a diagram illustrating an arrangement example (2) of a DMRS and CBs in an embodiment of the present invention.

FIG. 6 is a diagram illustrating an arrangement example (2) of a DMRS and CBs in an embodiment of the present invention. As illustrated in FIG. 6, the number of REs allocated to each CB is modified. The number of REs allocated to CB#0 is 42 in total because there are 12 REs in the second symbol, 12 REs in the third symbol, 12 REs in the fourth symbol, and 6 REs in the fifth symbol. The number of REs allocated to CB#1 is 48 in total because there are 6 REs in the fifth symbol, 12 REs in the sixth symbol, 12 REs in the seventh symbol, 12 REs in the eighth symbol, and 6 REs in the ninth symbol. The number of REs allocated to CB#2 is 66 (6+12*5) in total because there are 6 REs in the ninth symbol and 12 REs in each of the tenth symbol to the fourteenth symbol.

With respect to arrangement of a DMRS, if an additional DMRS, i.e. Additional DMRS, is arranged in a radio frame or if a DMRS is arranged other than near the top part of a radio frame such as if Frequency hopping is applied, a large CB size may be set for a CB closer to the DMRS and a small CB size may be set for a CB farther from the DMRS. That is, a CB size may be set in a descending order from a CB closer to the DMRS to a CB farther from the DMRS rather than in a descending order from a front part in time domain of the radio frame.

If the number of REs is allocated to each CB as described above and, for example, each CB size is made constant, adjustment such that an error rate for each CB is made closer to uniformity is made since an encoding rate of a CB allocated to a front part in time domain of a radio frame gets large and an encoding rate of a CB allocated to a rear part gets small.

Further, both of the number of REs and a CB size may be modified. For example, a ratio of the CB size divided by the number of REs may be set in a descending order from a front part in time domain of a radio frame.

In setting the ratio the CB size divided by the number of REs so that adjustment such that an error rate for each CB is made closer to uniformity is made, the CB size and the number of REs may be modified to any value. For example, a size of a CB allocated to a front part in time domain of a radio frame may be set large and a size of a CB allocated to a rear part may be set small as described in FIG. 5, and the number of REs of a CB allocated to the front part in time domain of the radio frame may be set small and the number of REs of a CB allocated to the rear part may be set large as described in FIG. 6. Also, for example, a size of a CB allocated to a front part in time domain of a radio frame may be set small and a size of a CB allocated to a rear part may be set large, and the number of REs of a CB allocated to the front part in time domain of the radio frame may be set small and the number of REs of a CB allocated to the rear part may be set large. Also, for example, a size of a CB allocated to a front part in time domain of a radio frame may be set large and a size of a CB allocated to a rear part may be set small, and the number of REs of a CB allocated to the front part in time domain of the radio frame may be set large and the number of REs of a CB allocated to the rear part may be set small.

In the embodiment described above, the base station device 100 or the user equipment 200 can decrease an error rate of a TB or CBG by setting a parameter related to a CB to make an error rate of each CB closer to uniformity depending on arrangement of a DMRS in a radio frame. Also, the base station device 100 or the user equipment 200 can make an error rate of each CB closer to uniformity by making an encoding rate larger for a CB closer to a position of a DMRS in a radio frame and making an encoding rate smaller for a CB farther from the position of the DMRS, and thus decrease an error rate of a TB or CBG. Further, the base station device 100 or the user equipment 200 can make an error rate of each CB closer to uniformity by making a CB size larger for a CB closer to a position of a DMRS in a radio frame and making a CB size smaller for a CB farther from the position of the DMRS, and thus decrease an error rate of a TB or CBG. Furthermore, the base station device 100 or the user equipment 200 can make an error rate of each CB closer to uniformity by making the number of REs smaller for a CB closer to a position of a DMRS in a radio frame and making the number of REs larger for a CB farther from the position of the DMRS, and thus decrease an error rate of a TB or CBG.

That is, it is possible to decrease an error rate of a transport block or code block group in encoding of a radio communication system.

<Device Configuration>

Next, functional configuration examples of the base station device 100 and the user equipment 200 that perform the processing and operations described above will be described. Each of the base station device 100 and the user equipment 200 includes at least functions implementing the embodiments. However, each of the base station device 100 and the user equipment 200 may comprise only some functions in the embodiments.

Figure 7:
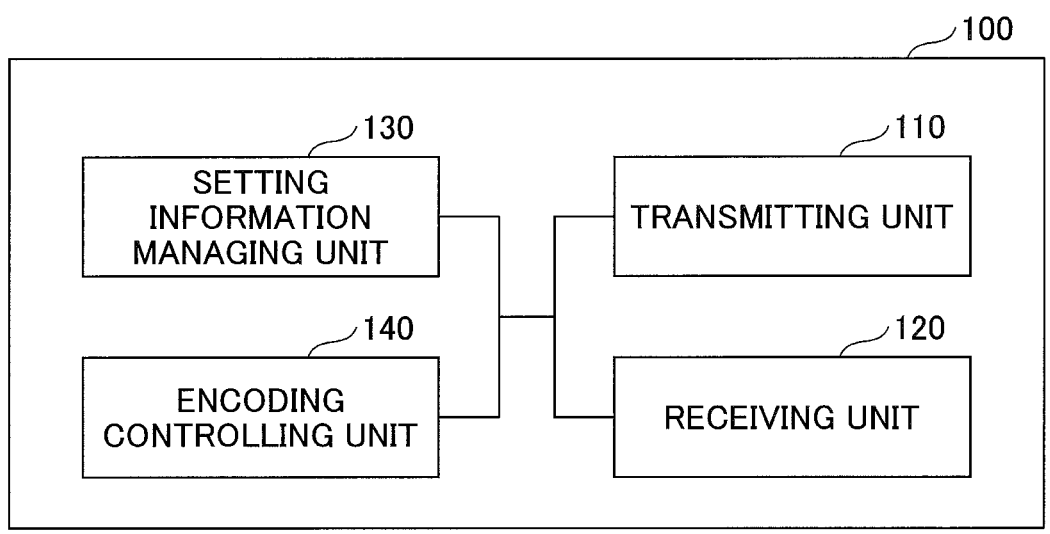
FIG. 7 is a diagram illustrating an example of a functional configuration of a base station device 100 in an embodiment of the present invention.

FIG. 7 is a diagram illustrating an example of a functional configuration of the base station device 100. As illustrated in FIG. 7, the base station device 100 comprises a transmitting unit 110, a receiving unit 120, a setting information managing unit 130, and an encoding controlling unit 140. The functional configuration illustrated in FIG. 7 is only an example. Division of the functions and names of functional units may be determined arbitrarily as long as the operations according to the embodiment of the present invention can be performed.

The transmitting unit 110 includes a function that generates a signal to be transmitted to the user equipment 200 side and wirelessly transmits the signal. The receiving unit 120 includes a function that receives various signals transmitted from the user equipment 200 and, for example, obtains information of a higher layer from the received signal. Also, the transmitting unit 110 has a function that transmits NR-PSS, NR-SSS, NR-PBCH, DL/UL control signals and the like to the user equipment 200. Further, the transmitting unit 110 transmits a transport block and code block to the user equipment 200 and the receiving unit 120 receives information indicating an ACK/NACK to the transmitted transport block from the user equipment 200.

The setting information managing unit 130 stores preset setting information and various pieces of setting information to be transmitted to the user equipment 200. Contents of the setting information are, for example, information used for generation of a transport block and code block, and so on.

The encoding controlling unit 140 performs control related to generation of a transport block and code block to be transmitted to the user equipment 200 in the base station device 100, and retransmission control related to an ACK/NACK received from the user equipment 200. A functional unit relating to signal transmission in the encoding controlling unit 140 may be included in the transmitting unit 110 and a functional unit relating to signal reception in the encoding processing unit 240 may be included in the receiving unit 120.

Figure 8:
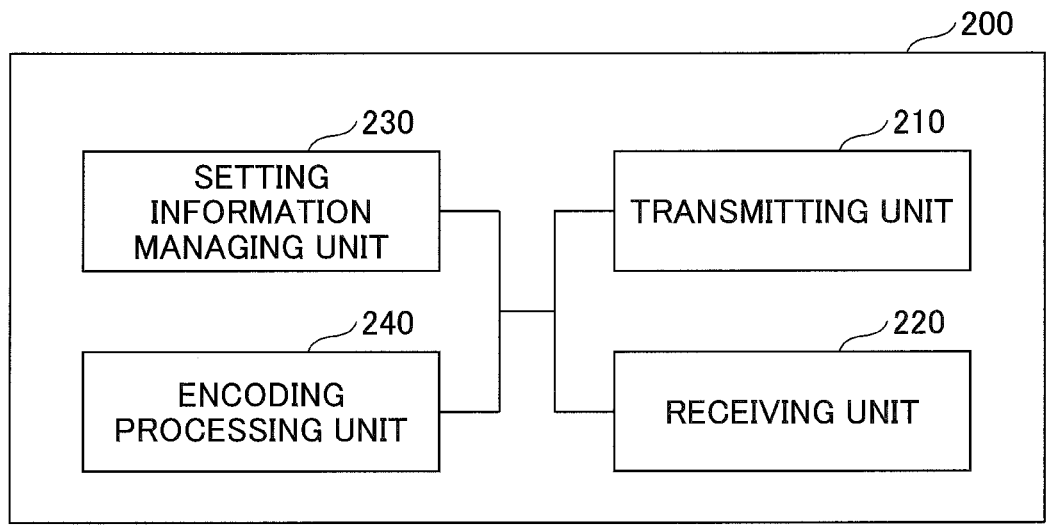
FIG. 8 is a diagram illustrating an example of a functional configuration of a user equipment 200 in an embodiment of the present invention.

FIG. 8 is a diagram illustrating an example of a functional configuration of the user equipment 200. As illustrated in FIG. 8, the user equipment 200 comprises a transmitting unit 210, a receiving unit 220, a setting information managing unit 230, and a encoding processing unit 240. The functional configuration illustrated in FIG. 8 is only an example. Division of the functions and names of functional units may be determined arbitrarily as long as the operations according to the embodiment of the present invention can be performed.

The transmitting unit 210 generates a transmit signal from transmit data and wirelessly transmits the transmit signal. The receiving unit 220 wirelessly receives various signals and obtains information of a higher layer from the received physical layer signal. Also, the receiving unit 220 has a function that receives NR-PSS, NR-SSS, NR-PBCH, DL/UL control signals and the like transmitted from the base station device 100. Further, the transmitting unit 210 transmits a transport block and code block to the base station device 100 and the receiving unit 120 receives ACK/NACK information to the transmitted transport block.

The setting information managing unit 230 stores various pieces of setting information received by the receiving unit from the base station device 100. The setting information managing unit 230 also stores preset setting information. Contents of the setting information are, for example, information used for generation of a transport block and code block, and so on.

The encoding processing unit 240 performs control related to generation of a transport block and code block to be transmitted to the base station device 100 in the user equipment 200, and retransmission control related to an ACK/NACK received from the base station device 100. A functional unit relating to signal transmission in the encoding processing unit 240 may be included in the transmitting unit 210 and a functional unit relating to signal reception in the encoding processing unit 240 may be included in the receiving unit 220.

<Hardware Configuration>

The functional configuration diagrams (FIGS. 7 and 8) used in the description of the embodiment of the present invention described above illustrate the blocks in the units of functions. These functional blocks (constituent units) are embodied in any combination of hardware and/or software. Means for embodying each functional block is not particularly limited. That is, each functional block may be embodied by one device into which a plurality of elements are physically and/or logically coupled or may be embodied by two or more devices that are physically and/or logically separated and that are connected directly and/or indirectly (for example, in a wired and/or wireless manner).

Figure 9:
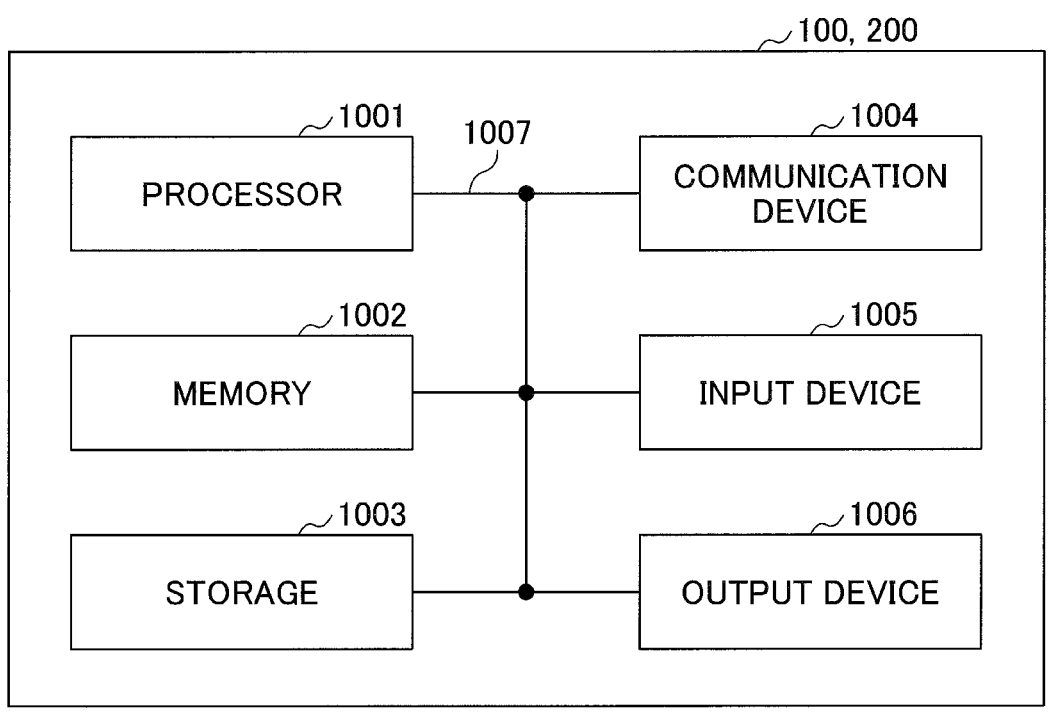
FIG. 9 is a diagram illustrating an example of a hardware configuration of the base station device 100 and the user equipment 200 in an embodiment of the present invention.

Also, for example, any of the base station device 100 and the user equipment 200 in an embodiment of the present invention may function as a computer that performs the processing according to the embodiment of the present invention. FIG. 9 is a diagram illustrating an example of a hardware configuration of a radio communication device that is the base station device 100 or the user equipment 200 according to an embodiment of the present invention. Each of the base station device 100 and the user equipment 200 described above may be physically configured as a computer device including a processor 1001, a memory 1002, a storage 1003, a communication device 1004, an input device 1005, an output device 1006, a bus 1007, and the like.

In the following description, the term "device" may be interchanged with a circuit, an apparatus, a unit, or the like. The hardware configurations of the base station device 100 and the user equipment 200 may include one or more of the devices 1001-1006 illustrated in the figure or may not include some of the devices.

Each function in the base station device 100 and the user equipment 200 are realized by causing hardware such as the processor 1001 and the memory 1002 to read predetermined software (program) and causing the processor 1001 to perform computation and to control communication by the communication device 1004 and reading and/or writing of data in the memory 1002 and the storage 1003.

The processor 1001 controls the entire computer, for example, by operating an operating system. The processor 1001 may be constituted by a central processing unit (CPU) including an interface with peripheral devices, a control device, a computation device, a register, and the like.

The processor 1001 reads a program (program codes), a software module, or data from the storage 1003 and/or the communication device 1004 to the memory 1002, and performs various processing operations in accordance therewith. As the program, a program causing a computer to perform at least a part of the operations in the embodiment described above is used. For example, the transmitting unit 110, the receiving unit 120, the setting information managing unit 130, and the encoding controlling unit 140 of the base station device 100 illustrated in FIG. 7 may be embodied by a control program that is stored in the memory 1002 and operated by the processor 1001. Also, for example, the transmitting unit 210, the receiving unit 220, the setting information managing unit 230, and the encoding processing unit 240 of the user equipment 200 illustrated in FIG. 8 may be embodied by a control program that is stored in the memory 1002 and operated by the processor 1001. Although the various processing operations have been described as being performed by a single processor 1001, the various processing operations may be simultaneously or sequentially performed by two or more processors 1001. The processor 1001 may be implemented as one or more chips. The program may be transmitted from a network via an electric communication line.

The memory 1002 is a computer-readable recording medium and may be constituted, for example, by at least one of an ROM (Read Only Memory), an EPROM (Erasable Programmable ROM), an EEPROM (Electrically Erasable Programmable ROM), a RAM (Random Access Memory), and the like. The memory 1002 may be called as a register, a cache, or a main memory (a main storage device). The memory 1002 can store a program (program codes), a software module, and the like that can be executed to perform processing operations according to an embodiment of the present invention.

The storage 1003 is a computer-readable recording medium and may be constituted, for example, by at least one of an optical disc such as a CD-ROM (Compact Disc ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, a magnetic strip, and the like. The storage 1003 may be called as an auxiliary storage device. The recording medium may be a database including the memory 1002 and/or the storage 1003, a server, or another appropriate medium.

The communication device 1004 is hardware (a transceiver device) for performing communication between computers via a wired network and/or a wireless network and is referred to as, for example, a network device, a network controller, a network card, a communication module, or the like. For example, the transmitting unit 110 and the receiving unit 120 of the base station device 100 may be embodied by the communication device 1004. The transmitting unit 210 and the receiving unit 220 of the user equipment 200 may be embodied by the communication device 1004.

The input device 1005 is an input device (such as, for example, a keyboard, a mouse, a microphone, a switch, a button, a sensor, or the like) that receives an input from the outside. The output device 1006 is an output device (such as, for example, a display, a speaker, an LED lamp, or the like) that performs outputting to the outside. The input device 1005 and the output device 1006 may be configured to be integrated (such as a touch panel).

The devices such as the processor 1001 and the memory 1002 are connected to each other via the bus 1007 for transferring information. The bus 1007 may be constituted by a single bus or may be configured by different buses between the devices.

Each of the base station device 100 and the user equipment 200 may be configured to include hardware such as a microprocessor, a DSP (Digital Signal Processor), an ASIC (Application Specific Integrated Circuit), a PLD (Programmable Logic Device), an FPGA (Field Programmable Gate Array), or the like, or a part or all of each functional block may be embodied by the hardware. For example, the processor 1001 may be implemented as at least one of the above hardware modules.

Summary of Embodiment

As described above, according to the embodiment of the present invention, there is provided a communication device that communicates with another communication device, the communication device comprising: an arrangement unit configured to arrange a demodulation reference signal and a group including a plurality of code blocks in a radio frame; and a transmitting unit configured to transmit the radio frame to the other communication device, wherein the plurality of code blocks are arranged in the radio frame based on a position of the demodulation reference signal in the radio frame.

According to the configuration, the base station device 100 or the user equipment 200 can decrease an error rate of a TB or CBG by setting a parameter related to a CB to make an error rate of each CB closer to uniformity depending on arrangement of a DMRS in a radio frame. That is, it is possible to decrease an error rate of a transport block or code block group in encoding of a radio communication system.

An encoding rate may be made larger for a code block closer to the position of the demodulation reference signal in the radio frame and an encoding rate may be made smaller for a code block farther from the position of the demodulation reference signal in the radio frame. According to the configuration, the base station device 100 or the user equipment 200 can make an error rate of each CB closer to uniformity by making an encoding rate larger for a CB closer to a position of a DMRS in a radio frame and making an encoding rate smaller for a CB farther from the position of the DMRS, and thus decrease an error rate of a TB or CBG.

A size of a code block may be made larger for the code block closer to the position of the demodulation reference signal in the radio frame and a size of a code block may be made smaller for the code block farther from the position of the demodulation reference signal in the radio frame. According to the configuration, the base station device 100 or the user equipment 200 can make an error rate of each CB closer to uniformity by making a CB size larger for a CB closer to a position of a DMRS in a radio frame and making a CB size smaller for a CB farther from the position of the DMRS, and thus decrease an error rate of a TB or CBG.

A number of resources on the radio frame allocated to a code block may be made smaller for the code block closer to the position of the demodulation reference signal in the radio frame and a number of resources on the radio frame allocated to a code block may be made larger for the code block farther from the position of the demodulation reference signal in the radio frame. According to the configuration, the base station device 100 or the user equipment 200 can make an error rate of each CB closer to uniformity by making the number of REs smaller for a CB closer to a position of a DMRS in a radio frame and making the number of REs larger for a CB farther from the position of the DMRS, and thus decrease an error rate of a TB or CBG.

The plurality of code blocks may be arranged based on a ratio between a size of a code block in the radio frame and a number of resources on the radio frame allocated to the code block. According to the configuration, the base station device 100 or the user equipment 200 can make an error rate of each CB closer to uniformity by setting a ratio between a size of a CB in a radio frame and the number of REs allocated to the CB.

If the demodulation reference signal is arranged near a top part of the radio frame, a size of a code block may be larger or same as a size of an immediately subsequent code block for the code block closer to the top part in time domain in the radio frame and a size of a code block may be smaller or same as a size of an immediately prior code block for the code block farther from the top part in time domain in the radio frame. According to the configuration, the base station device 100 or the user equipment 200 can make an error rate of each CB closer to uniformity by making a CB size larger for a CB closer to a position of a DMRS in a radio frame and making a CB size smaller for a CB farther from the position of the DMRS, and thus decrease an error rate of a TB or CBG.

Supplement of Embodiment

While the embodiments of the present invention have been described above, the disclosed inventions are not limited to the embodiments, but it could be understood by those skilled in the art that various modifications, alterations, alternatives, replacements, and the like can be made thereto. While specific numerical examples have been used to facilitate understanding of the present invention, the numerical values are only examples and appropriate values may be used, unless otherwise specified. The sorting of articles in the above description is not essential to the present invention, but matters described in two or more articles may be combined for use if necessary, or matters described in a certain article may be applied to matters described in another article (unless incompatible). The boundaries of the functional units or the processing units in the functional block diagrams do not necessarily correspond to boundaries of physical components. Operations of two or more functional units may be performed physically by a single component or an operation of a single functional unit may be performed physically by two or more physical components. Regarding the processing procedure described in the embodiment, the order of the processing operations may be changed unless incompatible. For convenience of explanation of the processing, the base station device 100 and the user equipment 200 have been described using the functional block diagrams, but such devices may be embodied in hardware, software, or a combination thereof. Software operated by the processor of the base station device 100 according to the embodiment of the present invention and software operate by the processor of the user equipment 200 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Notification of information is not limited to the aspects/embodiments described in this specification, but may be performed using other methods. For example, the notification of information may be performed physical layer signaling (such as DCI (Downlink Control Information), UCI (Uplink Control Information), or the like), higher layer signaling (such as RRC (Radio Resource Control) signaling, MAC (Medium Access Control) signaling, broadcast information (MIB (Master Information Block), SIB (System Information Block), or the like), other signals, or any combination thereof. The RRC signaling may be called as an RRC message and may be, for example, an RRC connection setup message, an RRC connection reconfiguration message, or the like.

The aspects/embodiments described in this specification may be applied to systems utilizing LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or next-generation systems to which the systems are extended.

The processing procedures, sequences, flowcharts, and the like of the aspects/embodiments described above in this specification may be changed in the order as long as they are not incompatible with each other. For example, in the method described in this specification, various step elements are presented in an exemplary order and the method is not limited to the presented order.

The specific operations which are performed by the base station device 100 in this specification may be performed by an upper node thereof in some cases. In a network comprising one or more network nodes including the base station device 100, it is obvious that various operations which are performed to communicate with the user equipment 200 can be performed by the base station device 100 and/or another network node (for example, an MME or an S-GW can be considered but the network node is not limited thereto) other than the base station device 100. Although a case where the number of network nodes other than the base station device 100 is one has been illustrated above, a combination of two or more other network nodes (for example, an MME and an S-GW) may be used.

The aspects/embodiments described in this specification may be used alone, may be used in combination, or may be switched with implementation thereof.

The user equipment 200 may also be called as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station device 100 may be called as an NB (NodeB), an eNB (enhanced NodeB), a gNB, a base station, or some other appropriate terms by those skilled in the art.

The terms "determining" and "deciding" as used in this specification may include various types of operations. For example, "determining" and "deciding" may include deeming that to perform judging, calculating, computing, processing, deriving, investigating, looking up (e.g., searching in a table, a database, or another data structure), or ascertaining is to perform "determining" or "deciding." Further, "determining" and "deciding" may include deeming that to perform receiving (e.g., reception of information), transmitting (e.g., transmission of information), input, output, or accessing (e.g., accessing data in memory) is to perform "determining" or "deciding." Furthermore, "determining" and "deciding" may include deeming that to perform resolving, selecting, choosing, establishing, or comparing is to perform "determining" or "deciding." That is, "determining" and "deciding" may include deeming that some operation is to perform "determining" or "deciding."

The expression "based on" as used in this specification does not mean to only "based on only," unless otherwise specified. That is, the expression "based on" means both "based on" and "based on at least."

As long as the terms "include" and "including" and derivatives thereof are used in this specification or the appended claims, the terms are intended to have a comprehensive meaning similarly to the term "comprising." Further, the term "or" as used in this specification or the appended claims is intended not to mean an exclusive or.

In the entire disclosure, for example, when an article such as a, an, or the is added in translation into English, such an article may include the plural unless otherwise recognized from the context.

In the embodiments of the present invention, the base station device 100 or the user equipment 200 is an example of a communication device. The transport block (TB) or the code block group (CBG) is an example of a group. The encoding controlling unit 140 or the encoding processing unit 240 is an example of an arrangement unit. The ACK/NACK is an example of an acknowledgement or a negative-acknowledgement. The number of REs is an example of the number of resources on a radio frame.

Although the present invention has been described in detail, it is obvious to those skilled in the art that the present invention is not limited to the embodiments described in this specification. The present invention can be practiced as modifications and alterations without departing from the spirit and scope of the present invention defined by the description in the appended claims. Therefore, the description in this specification is intended to be exemplary and does not have any restrictive meaning to the present invention.

LIST OF REFERENCE SYMBOLS

100 BASE STATION DEVICE
200 USER EQUIPMENT
110 TRANSMITTING UNIT
120 RECEIVING UNIT
130 SETTING INFORMATION MANAGING UNIT
140 ENCODING CONTROLLING UNIT
200 USER EQUIPMENT
210 TRANSMITTING UNIT
220 RECEIVING UNIT
230 SETTING INFORMATION MANAGING UNIT
240 ENCODING PROCESSING UNIT
1001 PROCESSOR
1002 MEMORY
1003 STORAGE
1004 COMMUNICATION DEVICE
1005 INPUT DEVICE
1006 OUTPUT DEVICE

The invention claimed is:

1. An apparatus comprising:
an input unit configured to receive an input;
a control unit configured to map a transport block including a plurality of code blocks to a plurality of symbols; and
a communication module including a transmission unit configured to transmit a signal including the plurality of symbols,
wherein the control unit maps the transport block to the plurality of symbols so that a number of resource elements of a first code block is less than a number of resource elements of a second code block, the first code block being nearest to a demodulation reference signal in a time domain, and the second code block being farthest from the demodulation reference signal in the time domain.

2. The apparatus as claimed in claim 1, wherein the demodulation reference signal is arranged near to a beginning of the plurality of symbols.

3. The apparatus as claimed in claim 1, wherein the input unit is a microphone, a switch, a button, or a sensor.

4. An apparatus comprising:
an output unit configured to output information;
a communication module including a reception unit configured to receive a transport block including a plurality of code blocks mapped to a plurality of symbols; and
a control unit configured to determine that, in the plurality of symbols, a number of resource elements of a first code block is less than a number of resource elements of a second code block, the first code block being nearest to a demodulation reference signal in a time domain, and the second code block being farthest from the demodulation reference signal in the time domain.

5. The apparatus as claimed in claim 4, wherein the output unit is a display, a speaker, or an LED lamp.

6. A communication method of an apparatus, comprising:
an input procedure of receiving an input;
a control procedure of mapping a transport block including a plurality of code blocks to a plurality of symbols; and
a transmission procedure of transmitting a signal including the plurality of symbols,
wherein the control procedure includes a procedure of mapping the transport block to the plurality of symbols so that a number of resource elements of a first code block is less than a number of resource elements of a second code block, the first code block being nearest to a demodulation reference signal in a time domain, and the second code block being farthest from the demodulation reference signal in the time domain.

* * * * *